April 19, 1938. W. A. PATRICK, JR 2,114,315
PROCESS OF CHEMICALLY REFINING HYDROCARBONS
Original Filed March 29, 1933
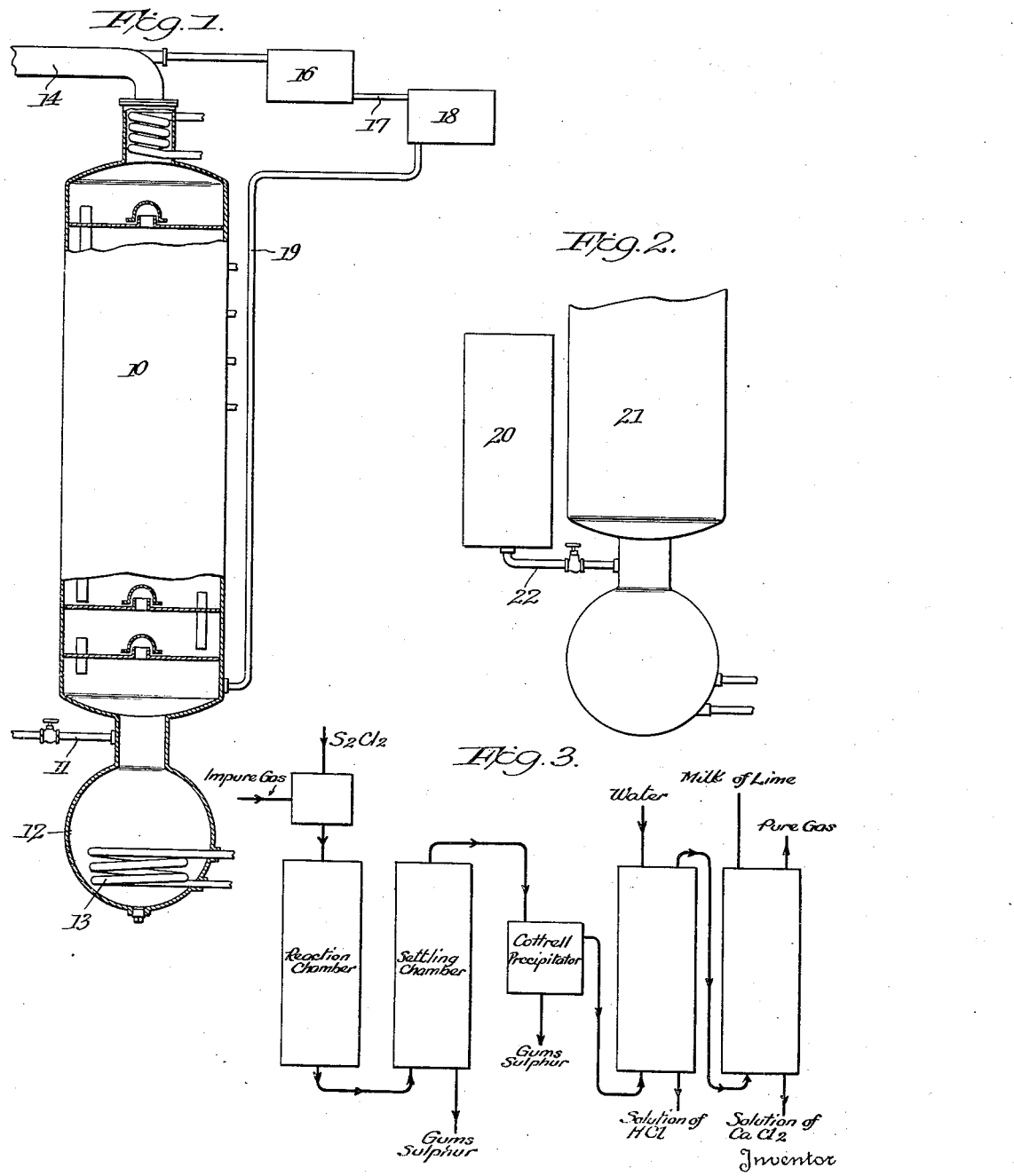

Patented Apr. 19, 1938

2,114,315

UNITED STATES PATENT OFFICE 2,114,315

PROCESS OF CHEMICALLY REFINING HYDROCARBONS

Walter A. Patrick, Jr., Baltimore, Md.

Application March 29, 1933, Serial No. 663,414
Renewed February 8, 1938

4 Claims. (Cl. 196—27)

The present invention relates to the refining of "light oils" and distillates thereof obtained from the distillation of coal or oil tar so as to produce a satisfactory motor fuel or a blending agent to improve the quality of motor fuels for internal combustion engines.

I have developed a novel process and a product which is distinguished from the usual chemically treated commercial distillates from light oil in that it is characterized (1) by the presence of the valuable aliphatic constituents of the light oils and (2) by being substantially free of deleterious substances, such as unstable aliphatics and sulphur compounds and impurities.

The invention further relates to the purification of gases manufactured for fuels, illuminants and other domestic and industrial applications from coal and/or petroleum which contain impurities similar to those found in light oils from coal and oil tars, and mineral oils and distillates thereof.

The present invention embodies a simple, rapid and complete treatment enabling the gaseous bodies to be refined and obtained (a) in a much more purified state than has heretofore been possible, and (b) the products are of enhanced quality in that the valuable constituents removed or destroyed by present day methods, are now preserved and made available.

In the case of hydrocarbons and hydrocarbon mixtures in liquid or gaseous phase, the object of the invention is to remove therefrom the deleterious substances which impair the final product, i. e., gums, resins, asphaltic materials, sulphur impurities, easily oxidizable, and unstable compounds. These objectionable substances are formed into relatively stable bodies and are rendered separable, i. e., in the liquid phase treatment are removed by distilling the valuable portions of the oil, and in the gaseous phase treatment are removed by settling and/or precipitation.

Ordinarily light oils are refined by treatment with sulphuric acid in order that the oil be freed of aliphatic hydrocarbons and sulphur compounds.

A more refined product obtained by the action of chlorine on the aliphatic hydrocarbons and sulphur compounds is described in the patent of A. O. Jaeger, No. 1,741,305. By taking advantage of the fact that the impurities (considered by Jaeger to be all of the aliphatic compounds) are more easily chlorinated than the aromatic hydrocarbons, it is stated that the latter are obtained in a high state of purity.

Eduard Lippman and Isidor Pollak, Monatshefte d. Chemie, 23,669, 1902, describe that "Commercial benzene was heated in a water bath for 192 hours with 15% sulphur chloride, until the evolution of HCl ceased. Benzene was then distilled with steam, dried with calcium chloride, and afterwards washed with dilute sodium hydroxide. It boiled at the constant temperature of 81° C. The product was found to be completely free of thiophene inasmuch as it did not show any indophene reaction with isatin and sulphuric acid. Thiophene free benzenes behave indifferently at 100° C. even after ten hours. Probably a halogen derivative of thiophene was formed."

Lippman, as stated, does not treat light oils with sulphur chloride, but rather treats commercial benzene, i. e., a material that has already been refined with sulphuric acid, and therefore, containing no potential gum forming substances.

Both the sulphuric acid method and the chlorine treatment remove all the aliphatic hydrocarbons. It is, of course, possible to decrease the amount of acid used so as to produce a product that contains appreciable amounts of the aliphatic hydrocarbons and also sulphur compounds. The control of this operation is attended by serious difficulties due to the fact that sulphuric acid is insoluble in the oil, and that it energetically attacks the aliphatic hydrocarbons. This difficulty is more pronounced in the case of the chlorine method due to the intense chemical activity of the latter on the aliphatic hydrocarbons.

It has always been the object of the above methods of refining light oil to remove the aliphatic hydrocarbons from the valuable aromatic hydrocarbons. The former were considered as impurities due to their tendency to polymerize to gums or resins. It is now recognized that not all the aliphatic hydrocarbons are unstable, in fact only a very small fraction of them form gums even when heated in a copper dish. Therefore, their complete removal by the sulphuric or chlorine treatment is not only undesirable, but in fact, produces a real loss of highly valuable motor fuel constituents.

I have discovered that a sulphur halide is a very satisfactory reagent for the undesirable aliphatic hydrocarbons and most of the sulphur compounds in light oil. That is to say, these aliphatic hydrocarbons which are unstable, and which produce gums upon standing or upon heating, undergo a rapid polymerizing action in the presence of sulphur chloride. The stable aliphatic hydrocarbons on the other hand, react so slowly with the sulphur chloride that it is practical to so select the amount of the reagent and control reaction conditions as to affect a complete separation of the unstable from the stable aliphatic hydrocarbons, which latter are preserved. Also the velocity of the reaction between the harmful sulphur compounds and sulphur chloride is much greater than between the stable aliphatic hydrocarbons, so it is likewise possible to separate these without affecting the valuable aliphatics. Sulphur present as carbon disulphide will not be acted upon by sulphur chloride but the presence of carbon disulphide in a motor fuel is not objectionable.

It is understood that sulphur chloride will not usually react with the aromatic hydrocarbons such as benzene, toluene, xylene, and the homologues thereof.

In carrying out my invention, I employ a sulphur halide in very small percentage, preferably not over 1% and carry out the reaction with or without elevated temperature and with optional use of a suitable catalyst. The reaction is rapid, the usual yellow colored light oil turning black with liberation of dry hydrochloric acid gas. By using a small percentage of the reagent, and controlling the reaction conditions, the reagent is selective and reacts with the unstable aliphatics, sulphur compounds and deleterious materials to produce high boiling relatively stable and separable bodies of reduced solubility. That is to say, the deleterious substances in the oil which comprise the unstable aliphatics, potential and actual gum forming constitutents and the sulphur compounds are changed into bodies which are recovered as a residue when the treated oil is distilled at usual temperatures.

By the use of sulphur chloride, it is possible to prepare a motor fuel from light oil that is colorless, stable upon heating or standing in sunlight, that contains no objectionable corrosive materials so as to affect copper, that leaves no appreciable residue of gum when evaporated to dryness in a copper dish, but which still contains large amounts (up to 10%) of valuable aliphatic hydrocarbons not present when the light oil is treated by the ordinary sulphuric acid method or by the action of chlorine.

An essential feature of my discovery is that by using a small percentage of the reagent, based upon the amount of actual and potential gum forming constituents in the oil and its sulphur content, such deleterious substances are not chlorinated, but enter into polymerizing reactions with the sulphur chloride under controlled treating conditions so as to produce bodies which are easily separable from the more valuable portions of the light oil.

Many halides of metals and metaloids have been suggested as refining reagents, notably $AlCl_3$, $ZnCl_2$, and $FeCl_3$, and others such as $AsCl_3$, $SbCl_3$, $SnCl_4$ have also been mentioned. Their use was directed either to cracking or to cause the complete removal of unsaturated aliphatic hydrocarbons. The halides of sulphur are milder polymerizing agents than the metallic chlorides, making it possible to select conditions that will result in only the elimination of objectionable constituents of the oil.

I have discovered that a sulphur halide, preferably sulphur mono-chloride ($S_2Cl_2$), properly regulated under suitable reaction conditions, constitutes a highly effective refining agent and may be employed as a substitute for the conventional sulphuric acid or chlorinating treatment.

The sulphur halide which I have most successfully employed is the mono-chloride ($S_2Cl_2$). But the di-chloride and tetrachloride of sulphur are also useful. Obviously, the same result may be obtained by using other reagents which react to form a sulphur halide.

The principle of my method consists in treating the impure light oils with sulphur chloride so as to produce a reaction between the actual and/or potential gum forming constituents and the sulphur chloride and thus form a gum or tarry product which is not appreciably volatile at distillation temperatures.

The amount of sulphur chloride must be carefully determined before distillation, since all or substantially all of this reagent must enter into the reaction with some constituent of the oil to be refined. I have discovered that the amount of reagent employed is of vital importance. Therefore, in every instance, the point at which no further amount of the reagent should be used must be determined.

The exact quantity of the reagent can be determined, for example, by adding small percentages of the same to the oil to be refined, refluxing for a short time, and then subjecting the mixture to distillation. The purity and other characteristics of the distillate will enable one to quickly ascertain the requisite amount of the reagent for the oil.

Moreover, all light oils do not show the same velocity of reaction with the reagent. It is, therefore, necessary to determine the length of the treatment with each variety of oil. This reaction velocity is dependent upon temperature, the nature of the oil to be refined, the concentration and composition of the sulphur chloride, and where a catalyst is employed, the nature of the catalyst.

I have found that ordinarily the sulphur chloride should be used in relatively small percentages, usually less than 1%. The reaction between the sulphur halide and the oil may, in some cases, be accelerated by a catalyst, such as finely divided clay or fuller's earth, copper, lead, zinc, and finely divided anhydrous sulfides of copper, lead, tin, arsenic and antimony. The reaction can take place in the cold, but ordinarily heat will reduce the time period.

The reaction is characterized by (1) chlorination of the valuable aliphatic and aromatic compounds does not take place so that addition or substitution chlorinated products of the valuable hydrocarbons are not formed; (2) the potential gum forming constituents or unstable aliphatics of the oil are reduced or condensed or polymerized to form separable bodies which are insoluble or are but slightly soluble, i. e., of reduced solubility in the oil, and which have a boiling point above that employed for distillation so that the valuable constituents of the oil are removable by distillation; (3) formation of substantially dry hydrochloric acid gas which, in some cases, may be recovered in the gaseous phase; and (4) the sulphur chloride reacts upon the potential gum forming constituents and sulphur compounds of the oil and is in such small percentage that no opportunity is afforded for the formation either of an increase of sulphur impurities, or objectionable chlorinated products, both of which would impair the final product. That is to say, the reaction of the sulphur chloride is controlled so that it acts to reduce the solubility of the deleterious substances in the oil and forms separable relatively stable heavy bodies having a boiling point above the normal distillation temperatures.

My improved process has numerous advantages as compared to the conventional sulphuric acid or chlorinating treatment to which there are objections so generally recognized that they need not be discussed. From the standpoint of yield, the recovery of the valuable and useful hydrocarbons is materially increased, as compared to the conventional acid treatments. The increased yield is equal to the amount of the valuable aliphatic and/or aromatic hydrocarbons which are usually destroyed by sulphuric acid treatment or chlorinating. The sulphur chloride is relatively inexpensive and the simplicity of the process reduces the refining expense, having in mind particularly that only small percentages of sulphur chloride are employed. The amount of the gum or tarry residue obtained is considerably less than the sludge produced by the acid or chlorine treatment. Further, the handling of large quantities of sulphuric acid or unstable chlorine compounds with attendant problems is avoided.

In addition, there is a substantial reduction in the time period of operation.

The product obtained has characteristics which clearly distinguish it from the product of the sulphuric acid or chlorine treatment and has a number of definite advantages.

It is well known, of course, that aromatic hydrocarbons are desirable in the motor fuel; my improved process does not attack the aromatic hydrocarbons or the stable and valuable aliphatics but preserves the same. The motor fuel produced is substantially water-white and sweet. It is useful as a motor fuel or as a blending agent with low quality fuels for improving the same.

Under the copper-dish test, both the factors of corrosion and gum residue are satisfactory. In other words, the product is satisfactory under the copper-dish test, from the standpoint of actual and potential gums.

An examination of the sulphur content of the motor fuel prepared in accordance with this invention discloses that it is less than four-tenths of 1%.

The motor fuel as stated is highly stable. When allowed to stand for a considerable period after distillation, even in the sunlight, it exhibits no appreciable deterioration, whereas commercial distillates obtained by the sulphuric acid or chlorine treatment shows very appreciable deterioration when subjected to the same tests. More particularly, the product of this process when subjected to this stability test shows little discoloration, and at the end of the period of test responds to the copper-dish test equally as well as before exposure.

The process is applicable to all oils and distillates which normally require chemical refining treatment. I will describe the invention in connection with the manufacture of (1) motor fuel from light oils, and (2) the purification of fuel and illuminating gases.

Light oils

Ordinary light oils from the distillation of coal and oil tars and similar materials are tested by refluxing or in any suitable manner to determine the quantity of potential gum forming constituents and the boiling point. These factors I find determine (1) the quantity of sulphur halide to be added, and (2) the control of the operation.

Where the amount of potential gums is high, a greater percentage of the chemical is employed. In cases where the oil is relatively low boiling or contains appreciable low boiling unsaturated hydrocarbons, the quantity of the chemical is regulated so as to avoid chlorination of the valuable low boiling constituents. I have found that the low boiling hydrocarbons require lesser amounts of the sulphur chloride and that, in fact, the use of an excessive percentage is objectionable.

I have found that for most light oils the percentage of sulphur halide need not be in excess of 1%, the exact percentage being determined as explained by the boiling point and actual and potential gum content. The amount will vary in the case of distillates from coal and oil tars from different sources.

The oil is treated in a suitable chamber by running therein a determined quantity of liquid sulphur mono-chloride, or the sulphur halide in gaseous phase is bubbled through the oil. The reaction may take place in the cold or room temperature where the hydrocarbons have a low boiling point, but is speeded or accelerated at elevated temperatures. The factors of heat and time required to satisfactorily complete the reaction will vary in accordance with the oil under treatment.

In some cases I prefer to use a catalyst or accelerator, such as one of the accelerators above mentioned, which will materially decrease the time factor.

The reaction which takes place, I believe to be (1) a combining of the sulphur chloride with the gum forming and sulphur compound constituents of the oil with liberation of substantially dry hydrochloric acid gas; (2) the changing or polymerization of these and other deleterious compounds into definite relatively stable bodies which are high boiling, separable, i. e., stable above usual distillation temperatures and less soluble in the oil.

The $S_2Cl_2$ is used in amount to react with the deleterious substances present, but in insufficient amount to attack the valuable aliphatic and aromatic hydrocarbons under the conditions of reaction. The reaction conditions, such as time period, temperature and pressure, and quantity of sulphur mono-chloride and/or catalyst are controlled to produce the desired result. Stated again, the desirable hydrocarbons are not affected, but the substances, such as gums, resins, tars, and sulphur compounds are changed or stabilized or formed into polymerized compounds which, upon distillation, are separable as a residue.

The reaction proceeds with formation of hydrochloric acid gas which is liberated and recovered as a dry gas. The oil under treatment, usually yellow, turns a dark or black color and a heavy precipitate forms comprising the gums, resins, and reaction compounds, together with free sulphur. It is noted that the heavy precipitate is much less in quantity than the "sludge" or "tar" formed when a sulphuric acid wash or chlorine treatment is employed.

The oil so treated is now distilled and this is satisfactorily accomplished in the usual manner. The temperatures employed will be determined by the oil under treatment, and, if desired, the distillation may be accomplished under reduced pressure and/or condensing means disposed intermediate the tower or at the outlet thereof for returning certain fractions back to the tower. Likewise, various of the fractions may be condensed and collected from the tower, i. e., separate fractions may be taken off.

The distillate recovered by the present method is remarkably free of gums and resins, as well as sulphur compounds, such as mercaptans, polysulphides and other sulphur impurities. The characteristics of the product have been described above.

In practicing the process, any suitable apparatus may be employed and various methods of procedure may be adopted as best suited to plant installation.

*Treatment of hydrocarbons in the gaseous phase*

In connection with the treatment of hydrocarbons in the gaseous phase, I purify coal gas, water gas, producer gas, oil gas and natural gas. With most of these products, substantially the same conditions are present as with light oils in that they will contain unstable compounds, polymerizable products and sulphur impurities. Thus, I will treat (1) petroleum hydrocarbons and hydrocarbons derived from coal and oil tars and light oils and distillates thereof in the gaseous phase; (2) gases produced by the destructive distillation of coal; and (3) mixed gases from the destructive distillation of coal enriched with petroleum or benzene hydrocarbons.

The operations for the treatment of gaseous phase products of this character now employ settling, scrubbing and washing means of various types usually disposed between the retort or other source of the gas and the gas holder, so as to provide a continuous purifying and treating procedure. The present invention will supplant the use of present expensive apparatus, but on the other hand, may be connected up to the usual installations for the production of these various gases. As stated above, my process applied to hydrocarbons in gaseous phase will remove therefrom only the unstable hydrocarbons, sulphur impurities and other deleterious and tarry materials, and at the same time, the valuable constituents of the illuminants and fuels are preserved.

The gases manufactured for fuels, illuminants and other domestic and industrial applications obtained from coal and/or petroleum by the usual processes contain impurities similar to those found in light oils from coal and oil tars, namely unstable hydrocarbons and deleterious sulphur compounds.

The unstable hydrocarbons undergo slow reactions whereby objectionable gums or resins are formed. It is known that the polymerization of the unstable hydrocarbons may be accelerated or retarded by the presence of various substances. For example, sulphuric acid, mercaptans, oxygen especially in the presence of metallic copper, are known to accelerate gum formation; while phenol, and a great number of organic substances (inhibitors) retard the polymerization.

I have discovered that a sulphur halide as mentioned above, e. g., sulphur chloride, is most efficient in causing the unstable hydrocarbons to polymerize without causing a loss of the valuable, more stable, unsaturated hydrocarbons. Furthermore, this reaction is highly specific in regard to the objectionable gum forming hydrocarbons.

For most purposes, I will consider the gases to be treated and purified as consisting of a mixture of hydrogen, carbon monoxide, saturated aliphatic hydrocarbons, stable unsaturated hydrocarbons, unstable unsaturated hydrocarbons, and sulphur compounds, the more objectionable of which is hydrogen sulfide. It is desirable to remove the last two types of substances, leaving the others substantially unaffected.

It is true that sulphur chloride may be made to enter into reaction with all of the above constituents of the gas, but the rate of the reaction is much greater in the case of the last two, namely, the unstable unsaturated hydrocarbons and sulphur compounds, than it is with the others.

When sulphur chloride enters into a reaction with the unstable hydrocarbons a gum is formed which is of such low volatility that it separates from the gas as a solid. In the reaction with the sulphur compounds the products are either high boiling liquids or sulphur and hydrochloric acid. For example,

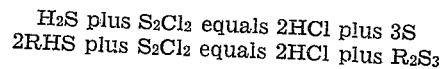

$$H_2S \text{ plus } S_2Cl_2 \text{ equals } 2HCl \text{ plus } 3S$$
$$2RHS \text{ plus } S_2Cl_2 \text{ equals } 2HCl \text{ plus } R_2S_3$$

Therefore, the action of the sulphur chloride may be said to produce easily separable high boiling substances from the gaseous impurities of unstable hydrocarbons and volatile sulphur compounds.

Furthermore, the reaction between the sulphur chloride and the above impurities is so much more rapid than with the valuable portions of the gas that an amount of sulphur chloride may be added that is just sufficient to enter into reaction with the impurities, usually less than 1%.

To give a concrete example of the action of the sulphur chloride on the hydrocarbons, the following is advanced in explanation of what occurs when a gaseous mixture of hydrogen, methane, ethane, ethylene, and cyclopentadiene is treated with sulphur mono-chloride. The last two are unsaturated hydrocarbons, but ethylene is a valuable constituent of the gas while the $C_5H_6$ readily polymerizes to form solid gums. An amount of $S_2Cl_2$ could be added to this mixture sufficient to cause the polymerization of the cyclopentadiene and it would enter completely into their reaction because the rate of this change is so much greater than that of any other reaction that could take place.

Therefore, in the practical operation an amount of the sulphur chloride sufficient to enter into reaction with the impurities is added to the gas, sufficient time allowed for the necessary reactions to take place, the solid bodies formed separated, and the hydrochloric acid washed out with water and a little lime at the very end of the process.

Any suitable apparatus may be employed for carrying out the treatment and purification of the hydrocarbons in the gaseous phase. Thus, the present treatment is designed to supplant present practice but may be combined with the conventional treatment, or take place prior to or after the gas has been treated by the process already installed at a particular plant.

In light of the above facts, it will be understood that a sulphur halide reagent is most efficient in purifying the gases obtained from the distillation of coal or petroleum products. I am confronted with the same problem as in the refining of the light oils which may be considered as the "heavier" parts of the gas, that is, the removal of unstable gum forming hydrocarbons and objectionable sulphur compounds. The unstable hydrocarbons form separable gums or resins with the sulphur chloride. The hydrogen sulphide forms sulphur and hydrochloric acid. The separation of the solid impurities after treatment with sulphur chloride is accomplished by settling or electrical precipitation, while the hydrochloric acid is removed by washing with water and lime.

In the accompanying drawing,

Figure 1 is a diagrammatic view of a typical apparatus;

Figure 2 is a fragmentary diagrammatic view of a modified form of apparatus; and Figure 3 is a flow sheet representative of the treatment of hydrocarbons in gaseous phase.

Referring to the drawing, 10 indicates a conventional fractionating column into which the light oils may be introduced through a pipe 11 leading from any suitable source. The lower end of the column forms a residue receiving chamber 12 having a draw-off outlet, and heat may be applied to the oil within the column as by means of a suitable internal heating coil 13. The treating agent, such as sulphur mono-chloride, may be initially introduced through pipe 19 in a percentage predetermined as hereinbefore described, and the reaction permitted to take place preferably in the presence of heat supplied by means of the heating coil. Such pressures may be employed as will prevent any substantial distillation of the product during the reaction period. The reaction conditions, however, will be such that hydrochloric acid gas as liberated may be taken off through the pipe 14 at the upper end of the column and carried either to an absorber not shown and/or to a chamber 16, wherein chlorine may be separated from the hydrochloric acid gas for the purpose of supplying additional reagent to the still in further operations. That is to say, the chlorine liberated in the chamber 16 may be conducted by pipe 17 to a chamber 18, wherein it will be combined with sulphur in a conventional manner to produce sulphur chloride. The sulphur chloride may be conducted as by the pipe 19 to the column, as required. The sulphur obtained from the reaction in the column may be removed from time to time, and treated for use in the chamber 18 to produce the sulphur chloride.

Instead of the apparatus illustrated in Figure 1, it may be desirable, in some instances, to treat the light oils in a chamber independent of the fractionating column and store the same for supply to the fractionating column as required. For example, as illustrated in Figure 2, a storage chamber 20 may be utilized to store the oil which has been previously treated with the reagent and the same may be supplied to a distillation column 21 or a battery of such columns through a pipe or pipes 22.

In order that the practical application of the process may be more clearly understood and merely by way of example, I will describe typical reaction processes which have heretofore been conducted.

Crude light oils from oil and coal tars are supplied to the column. The oil is usually a deep yellow. About 0.3 of 1% of sulphur mono-chloride is added to the oil and the mixture heated for twenty minutes or until the mass turns definitely black, disclosing that the reaction is complete. By the use of one of the catalysts mentioned, e. g., fuller's earth, in about 1%, the time period of reaction is reduced and the sulphur halide need only be supplied in amount of substantially 0.15 of 1%.

The reaction being complete, the oil is distilled at a temperature up to 130° C. and the desired fractions taken off and condensed. The purified distillate is water-white, stable, and comprises a mixture of aliphatic and aromatic compounds. It is useful as a fuel and blending agent and is a much more satisfactory product than commercial "Benzol". The product is substantially free of deleterious substances frequently encountered with available products and is more desirable in that it contains an optimum of the valuable aromatics and aliphatics, the latter heretofore being necessarily absent in the so-called "Benzol" products.

Referring to Figure 3, the impure gas from a retort is passed to mixing chamber into which is introduced sulphur mono-chloride in gaseous phase and in percentage based upon the amount of actual and potential gum forming constituents, unstable hydrocarbons and sulphur impurities present in the gas. The percentage of sulphur halide varies but is usually less than 1%. The gaseous mixture is passed into a chamber where the reactions described above take place. Heating will, in some cases, be resorted to, but generally is unnecessary and the same is true with respect to a catalyst. Where a catalyst is used, preferably an inert gas is employed. The treated gas passes into a settling or cooling chamber and the heavy bodies, tars, gums, and free sulphur and sulphur compounds formed by the reaction are condensed and/or precipitated and removed. Then the gas is passed to another settling or cooling chamber, but preferably a "Cottrell" (electrical) precipitator is used for removing any remaining heavy bodies, tars, gums, free sulphur and sulphur compounds. This second settling or precipitation step, in some cases, will be omitted.

The gas is now bubbled through cold water in which the hydrochloric acid gas liberated by the reaction is soluble and is removed.

The purified gas is then, if necessary, passed or bubbled through a milk of lime solution with which any remaining hydrochloric acid gas reacts and is removed as $CaCl_2$. The gas obtained from the last treatment is collected in a holder ready for use as illuminants and fuels. It is free from deleterious substances to a more perfect degree than heretofore obtained and is richer in valuable hydrocarbons and more constant and stable than conventional products.

The process is continuous and is useful for treatment of hydrocarbons and hydrocarbon mixtures in the gaseous phase as described herein.

I claim:

1. The process of chemically treating hydrocarbons such as petroleum hydrocarbons, light oils, distillates thereof, and mixtures of the same thereof in gaseous phase, to obtain products free of easily oxidizable or otherwise unstable substances as well as resinous, tarry or asphaltic materials and sulphur impurities which comprises reacting upon the deleterious materials in the hydrocarbon including potential gum-forming substances with up to substantially 1% of sulphur chloride in amount and under such conditions as to polymerize such substances into stable high boiling separable compounds without affecting the aliphatic constituents of the hydrocarbon, and separating out such high boiling compounds.

2. A process in accordance with claim 1 in which the sulphur chloride employed is sulphur mono-chloride.

3. A process in accordance with claim 1 in which there is treated a mixture of hydrocarbons obtained from the destructive distillation of carbonaceous material and petroleum hydrocarbons in gaseous phase.

4. A process in accordance with claim 1 in which there is treated a mixture of hydrocarbons obtained from the destructive distillation of carbonaceous material and petroleum hydrocarbons in gaseous phase and in which the treating agent is sulphur mono-chloride.

WALTER A. PATRICK, Jr.